United States Patent
Ma et al.

(10) Patent No.: US 9,443,277 B2
(45) Date of Patent: Sep. 13, 2016

(54) METHOD FOR EMBEDDING AND EXTRACTING MULTI-SCALE SPACE BASED WATERMARK

(71) Applicant: Beijing University of Technology, Beijing (CN)

(72) Inventors: Wei Ma, Beijing (CN); Shuo Liu, Beijing (CN); Lijuan Duan, Beijing (CN)

(73) Assignee: Beijing University of Technology, Beijing (CN)

( * ) Notice: Subject to any disclaimer, the term of this patent is extended or adjusted under 35 U.S.C. 154(b) by 19 days.

(21) Appl. No.: 14/753,020

(22) Filed: Jun. 29, 2015

(65) Prior Publication Data

US 2016/0012564 A1    Jan. 14, 2016

(30) Foreign Application Priority Data

Jul. 10, 2014   (CN) .......................... 2014 1 0327861

(51) Int. Cl.
*G06K 9/00* (2006.01)
*G06T 1/00* (2006.01)
*G06K 9/62* (2006.01)
*G06K 9/46* (2006.01)
*G06T 3/40* (2006.01)

(52) U.S. Cl.
CPC .............. *G06T 1/0021* (2013.01); *G06K 9/46* (2013.01); *G06K 9/6215* (2013.01); *G06T 3/40* (2013.01); *G06K 2009/4666* (2013.01); *G06T 2201/0061* (2013.01); *G06T 2207/20021* (2013.01)

(58) Field of Classification Search
None
See application file for complete search history.

(56) References Cited

U.S. PATENT DOCUMENTS

2007/0014428 A1*   1/2007  Kountchev ........... G06T 1/0028
                                                                           382/100

* cited by examiner

*Primary Examiner* — Atiba O Fitzpatrick
(74) *Attorney, Agent, or Firm* — Platinum Intellectual Property LLP (57) ABSTRACT

A method for embedding and extracting a multi-scale space based watermark, comprises: constructing a pyramid structure of an original image by dividing each carrier image layer into M square carrier image blocks of the same size; constructing a multi-scale structure of a watermark image; embedding a watermark by embedding each watermark image into a corresponding carrier image block to obtain the original image containing the watermark; locating in the pyramid structure of the original image a target image from which a watermark will be extracted; extracting the watermark by obtaining an estimated watermark by means of the target image block and the reference image block; comparing watermarks by evaluating similarity between the estimated watermark and a watermark image to which the reference image block corresponds. Due to the multi-resolution block pyramid data structure in the present invention, a large scale attack is decomposed into a multi-level small scale attack.

15 Claims, 3 Drawing Sheets

METHOD FOR EMBEDDING AND EXTRACTING MULTI-SCALE SPACE BASED WATERMARK

CROSS-REFERENCE TO RELATED APPLICATION

This application claims the priority benefit of Chinese patent application No. 201410327861.0, filed Jul. 10, 2014. The entirety of the above-mentioned patent application is hereby incorporated by reference herein and made a part of specification.

FIELD OF THE INVENTION

The present invention relates to a technical field of information hiding and image processing, and particularly to a method for embedding and extracting a multi-scale space based watermark.

BACKGROUND ART

With the continuous development of photography technology and image stitching technology, an ultra high definition image has gradually been widely applied for recording reliable data like astronomical observation, geological survey, aerial reconnaissance, security monitoring, antiques. This image has extremely high commercial value, and thus it is of vital importance to protect copyright of this image.

A digital watermark appears as an information hiding technology against the difficulty in judicially identifying copyright of digital products. In this technology, specific information is embedded into original data to be protected for verifying proprietorship of electronic data. As one of the important manners for announcing and protecting a general image copyright, the effects of this technology have been recognized to a certain extent. However, the ultra high definition image mentioned above goes beyond the ability of existing digital watermark algorithms. The reason for this mainly lies in that the ultra high definition image is rich in content and has a high resolution. A small portion of the image or a version of the image which is formed by reducing the image by a factor of a dozen still has a high collection value. The corresponding digital watermark solution is confronted with a large scale cropping attack and a large scale reducing attack, and these two kinds of attacks are blind spots for the conventional watermark algorithms.

SUMMARY

In view of the above technical problem, the present invention provides a robust method for embedding and extracting a multi-scale space based watermark, which is resistant to large-scale cropping attack and large-scale reducing attack.

The present invention provides the following technical solutions.

A method for embedding and extracting a multi-scale space based watermark, comprises the following steps:

a first step of constructing a pyramid structure of an original image by taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \leq i \leq L$, and N is a constant value, and dividing each carrier image layer into M square carrier image blocks of the same size;

a second step of constructing a multi-scale structure of a watermark image by: generating a watermark image of a smaller size than the carrier image block for each carrier image block;

a third step of embedding a watermark by: embedding each watermark image into a corresponding carrier image block to obtain the original image containing the watermark;

a fourth step of locating in the pyramid structure of the original image a target image from which a watermark will be extracted by taking one of the carrier images as a match template, matching the target image with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image; on basis of the first region, determining a second region from the carrier image layer which matches the target image, selecting a target image block from the target image, selecting a carrier image block which matches the target image block from the second region, and taking the carrier image block as a reference image block;

a fifth step of extracting the watermark by: obtaining an estimated watermark by means of the target image block and the reference image block;

a sixth step of comparing watermarks by: evaluating similarity between the estimated watermark and a watermark image to which the reference image block corresponds.

Preferably, in the method for embedding and extracting a multi-scale space based watermark, during embedding each watermark image into the corresponding carrier image block in the third step, a channel of a corresponding carrier image block which is close to a dominant color is taken as a carrier channel, and the watermark image is embedded into the carrier channel.

Preferably, in the method for embedding and extracting a multi-scale space based watermark, the fifth step is performed by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; and obtaining the estimated watermark by means of a carrier channel of the target image block and a carrier channel of the modified reference image block.

Preferably, in the method for embedding and extracting a multi-scale space based watermark, during embedding each watermark image into the corresponding carrier image block in the third step, a transform-domain algorithm is adopted.

Preferably, in the method for embedding and extracting a multi-scale space based watermark, the first region on the match template which matches the target image and the proportional relation between the target image and the match template in the fourth step are calculated by:

extracting feature points from the target image and the match template respectively, calculating local feature vectors and dimensional feature vectors of feature points from the target image and the match template respectively;

calculating match point pairs between the target image and the match template by means of a feature point match algorithm, wherein, a feature point of target image matches a feature point of the match template to constitute a match point pair, the match point pairs are used to express the first region of the match template which matches the target image, and a dimensional proportion between the match point pairs is used as the proportional relation between the target image and the match template.

A method for embedding and extracting a multi-scale space based watermark, comprises the following steps:

a first step of constructing a pyramid structure of an original image by taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \le i \le L$, and N is a constant value; and dividing each carrier image layer into M square carrier image blocks of the same size;

a second step of constructing a multi-scale structure of a watermark image, wherein the multi-scale structure comprises L layers, each layer comprises M watermark images of the same size, a watermark image in a layer is formed by reducing a length and width of a watermark image in an underlying layer by a factor of 1/N; and each carrier image block corresponds to a watermark image of a smaller size than the carrier image block;

a third step of embedding a watermark by: embedding each watermark image into a corresponding carrier image block to obtain the original image containing the watermark;

a fourth step of locating in the pyramid structure of the original image a target image from which a watermark will be extracted by taking one of the carrier images as a match template, matching a target image from which a watermark will be extracted with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image from which a watermark will be extracted; on basis of the first region, determining a second region from the carrier image layer which matches the target image, selecting a target image block from the target image, selecting a carrier image block which matches the target image block from the second region, and taking the carrier image block as a reference image block;

a fifth step of extracting the watermark by: obtaining an estimated watermark by means of the target image block and the reference image block;

a sixth step of comparing watermarks by: evaluating similarity between the estimated watermark and a watermark image to which the reference image block corresponds.

Preferably, in the method for embedding and extracting a multi-scale space based watermark, during embedding each watermark image into the corresponding carrier image block in the third step, a channel of a corresponding carrier image block which is close to a dominant color is taken as a carrier channel, and the watermark image is embedded into the carrier channel.

Preferably, in the method for embedding and extracting a multi-scale space based watermark, the fifth step is performed by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; and obtaining the estimated watermark by means of a carrier channel of the target image block and a carrier channel of the modified reference image block.

Preferably, in the method for embedding and extracting a multi-scale space based watermark, during embedding each watermark image into the corresponding carrier image block in the third step, a transform-domain algorithm is adopted.

Preferably, in the method for embedding and extracting a multi-scale space based watermark, N has a value of 2.

A method for embedding and extracting a multi-scale space based watermark, comprises the following steps:

a first step of constructing a pyramid structure of an original image by taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \le i \le L$, and N is a constant value;

a second step of constructing a multi-scale structure of a watermark image, wherein the multi-scale structure comprises L layers, a watermark image in a layer is formed by reducing a length and width of a watermark image in an underlying layer by a factor of 1/N; and each carrier image corresponds to a watermark image of a smaller size than the carrier image;

a third step of embedding a watermark by: embedding each watermark image into a corresponding carrier image to obtain the original image containing the watermark;

a fourth step of locating in the pyramid structure of the original image a target image from which a watermark will be extracted by taking one of the carrier images as a match template, matching the target image with the match template, on basis of a proportional relation between the target image and the match template and a proportional relation between the match template and the remaining L−1 carrier image layers, determining a carrier image layer with a proportion which is closest to that of the target image, and taking the carrier image layer as a reference image of the target image;

a fifth step of extracting the watermark by: obtaining an estimated watermark by means of the target image and the reference image;

a sixth step of comparing watermarks by: evaluating similarity between the estimated watermark and a watermark image to which the reference image corresponds.

Preferably, in the method for embedding and extracting a multi-scale space based watermark, during embedding each watermark image into the corresponding carrier image block in the third step, a channel of a corresponding carrier image block which is close to a dominant color is taken as a carrier channel, and the watermark image is embedded into the carrier channel.

Preferably, in the method for embedding and extracting a multi-scale space based watermark, the fifth step is performed by: calculating a pixel value proportion between a channel of the target image into which a watermark image has not been embedded and a corresponding channel in the reference image, multiplying a pixel value of the reference image by the pixel value proportion; on basis of the pixel value proportion, modifying a pixel value domain of the reference image, so that the channel of the target image into which the watermark image has not been embedded has a pixel value consistent with that of a corresponding channel in the modified reference image; and obtaining the estimated watermark by means of a carrier channel of the target image and a carrier channel of the modified reference image.

Preferably, in the method for embedding and extracting a multi-scale space based watermark, N has a value of 2.

Preferably, in the method for embedding and extracting a multi-scale space based watermark, in the second step, each watermark image is further subject to a two-dimensional scrambling pretreatment.

In the method for embedding and extracting a multi-scale space based watermark of the present invention, a block pyramid data structure of the original image is firstly constructed on basis of a concept of multi-resolution image space and image blocking. Then, in the step of embedding a watermark, the multi-scale watermark information is embedded into carrier image blocks in a multi-level and intensive manner. Then, in the step of extracting watermark, feature points are detected in the target image from which a watermark will be extracted, description of the feature points is determined, and the target image from which a watermark will be extracted is located in the pyramid structure of the original image by means of a feature point match algorithm to determine a carrier image block to which the target image corresponds. The carrier image block is taken as a reference for extracting the watermark information from the target image, and the similarity between the watermark information and the corresponding watermark image is evaluated. Due to the multi-resolution block pyramid data structure in this method, a large scale attack is decomposed into a multi-level small scale attack, and a space domain and a transform domain are organically combined to ensure invisibility and robustness of the watermark information under a large scale geometrical attack. On the premise of the same watermark capacity, the method has an improved imperceptibility and shows an improved robustness against a large scale geometrical transform.

DETAILED DESCRIPTION OF EMBODIMENTS

The present invention will be described in details hereinafter by reference to the accompanying drawings.

Figure 1:
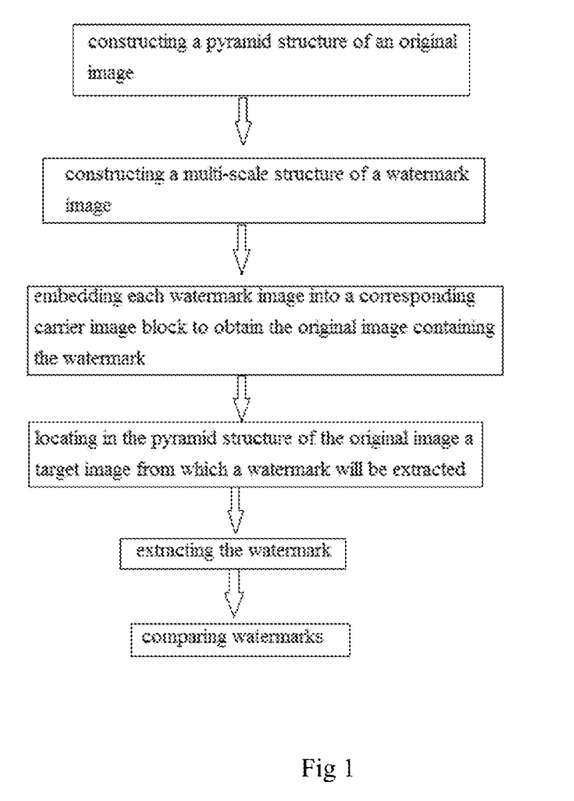
FIG. 1 is a flow chart for illustrating a method for embedding and extracting a multi-scale space based watermark in a first embodiment of the present invention.

As shown in FIG. 1, the present invention provides a method for embedding and extracting a multi-scale space based watermark, which comprises the following steps.

In a first step, a pyramid structure of an original image is constructed by: taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \leq i \leq L$, and N is a constant value; and dividing each carrier image layer into M square carrier image blocks of the same size. It is an object of this step to construct a multi-resolution multi-scale image. N preferably has a value of 2.

In a second step, a multi-scale structure of a watermark image is constructed by generating a watermark image of a smaller size than the carrier image block for each carrier image block. In fact, each layer of the multi-scale structure should correspond to each layer of the pyramid structure. Apart from the difference in sizes, each watermark image comprises the same watermark information. To ensure that resolution and visual effect of the carrier image block are not affected after a watermark image is embedded, it is required that the watermark image shall have a size smaller than the corresponding carrier image block. In the present invention, the carrier image block preferably has a size of 256×256 pixels.

In particular, the multi-scale structure of the watermark image can be constructed as follow. The multi-scale structure comprises L layers, each layer comprises M watermark images of the same size, and a watermark image in a layer is formed by reducing a length and width of a watermark image in an underlying layer by a factor of 1/N. Due to the fact that the watermark image itself has a limited number of pixels, in order to match the pyramid structure of an original image which has a relatively large number of levels, it is preferably to reduce a size of the watermark image in an alternate level, i.e., the second layer over the lowest layer has the same size as the lowest layer, the third layer has a length and width which is 1/N of the length and width of the lowest layer, the fourth layer has the same size as the third layer, and the fifth layer has a further reduced size.

For purpose of improving security of the watermark image, watermark images of different resolutions are combined with preprocessing keys respectively, and the initial watermark information is subject to chaotization, encryption, or scrambling. In the present invention, the initial watermark information is preferably subject to two-dimensional scrambling pretreatment.

In a third step, a watermark is embedded by embedding each watermark image into a corresponding carrier image block to obtain the original image containing the watermark. The embedding method can adopt those methods in the prior art.

In a fourth step, a target image from which a watermark will be extracted is located in the pyramid structure of the original image by: taking one of the carrier images as a match template, matching the target image with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image; on basis of the first region, determining a second region from the carrier image layer which matches the target image, selecting a target image block from the target image, selecting a carrier image block which matches the target image block from the second region, and taking the carrier image block as a reference image block.

In a fifth step, the watermark is extracted by obtaining an estimated watermark by means of the target image block and the reference image block.

In a sixth step, watermarks are compared by evaluating similarity between the estimated watermark and a watermark image to which the reference image block corresponds.

In the present invention, watermark images are embedded into all of the carrier image layers, and each carrier image layer has a different resolution. In case the original image suffers from a large scale reducing attack and square cropping attack simultaneously (i.e., an image pirate reduces the original image and crops a portion from the reduced image), it is possible to determine whether the original image has been pirated in the following manner: the target image from which a watermark will be extracted is located in the pyramid structure to a carrier image layer with a corresponding proportion, the carrier image block corresponding to the target image is found and taken as a reference image block, and effective watermark information is extracted from the target image.

During extracting the watermark information from the target image, a portion on the corresponding carrier image which matches the target image (i.e., a second region) does not always only comprise one carrier image block. Therefore, it is required to select a target image block from the target image, select a matching carrier image block from the second region, and extract an estimated watermark by means of the target image block and the carrier image block.

Here, determining the second region from the carrier image layer which matches the target image on basis of the first region can be realized by the prior art techniques. In the pyramid structure, layer, there are relationship among layers, i.e., a partial image of the original image can be located in each carrier image layer by reducing level by level.

In the method for embedding and extracting a multi-scale space based watermark, during embedding each watermark image into the corresponding carrier image block in the third step, a channel of a corresponding carrier image block which is close to a dominant color is taken as a carrier channel, and the watermark image is embedded into the carrier channel. Namely, by fully considering the effect of relationships among channels, channels with close dominant colors are taken as carrier channels, while the remaining channels are taken as reference for image attack like color modification during watermark extraction. In this way, if a color channel of less importance is removed by an attacker, the watermark information will not be affected, thus overall robustness of the algorithm is improved.

Accordingly, if a channel of a corresponding carrier image block which is close to a dominant color is taken as a carrier channel, in the method for embedding and extracting a multi-scale space based watermark, the fifth step is performed by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; and obtaining the estimated watermark by means of a carrier channel of the target image block and a carrier channel of the modified reference image block.

For example, the color channel of a reference image block has a RGB value of 10, 10, 10, and R channel is selected as the carrier channel for the reference image block. Once a watermark is embedded, the value of R channel varies, while values of G, B channels are constant. If the color channel of a target image block has a RGB value of 60, 20, 20, it can be determined that a color of the target image block has been modified by G or B channel calculation, and the pixel value proportion is 2. A pixel value domain of the reference image block is modified by multiply pixel values of the reference image block by the above-mentioned pixel value proportion, and the modified reference image block has a RGB value of 20, 20, 20. At this time, a watermark is estimated by calculation on basis of the carrier channel R of the target image block and the carrier channel R of the modified reference image block. In the present invention, comparison is performed between non-carrier channels to calculate the effect of the attacker on the carrier channel, so that this effect is eliminated during watermark extraction, and the watermark information is effectively extracted. The method of the present invention can resist attacks in form of color modification, removal of a color channel of less importance.

In the method for embedding and extracting a multi-scale space based watermark, during embedding each watermark image into the corresponding carrier image block in the third step, a transform-domain algorithm is adopted. There are two common transform-domain algorithms, i.e., a DCT algorithm proposed in "Secure Spread Spectrum Watermarking for Multimedia" by I. J. Cox et al. in "IEEE Transactions on Image Processing", 1997, and DWT algorithm proposed in "Improved Wavelet Based Watermarking Through Pixel Wise Masking" by M. Barni et al. in "IEEE Transactions on Image Processing", 2001.

If the transform-domain algorithm is adopted to embed a watermark image, during watermark extraction, the target image block and the reference image block are transformed into a transform domain which is consistent with a transform domain for embedding the watermark, two images in this transform domain are obtained, and a difference image between these two images is calculated. Finally, the difference image is inversely transformed into a space domain to obtain an estimated watermark. If other methods for embedding a watermark are adopted, corresponding inverse operations are used to obtain the watermark information.

In the method for embedding and extracting a multi-scale space based watermark, the first region on the match template which matches the target image and the proportional relation between the target image and the match template in the fourth step are calculated by: extracting feature points from the target image and the match template respectively, calculating local feature vectors and dimensional feature vectors of feature points from the target image and the match template respectively; calculating match point pairs between the target image and the match template by means of a feature point match algorithm, wherein, a feature point of target image matches a feature point of the match template to constitute a match point pair, the match point pairs are used to express the first region of the match template which matches the target image, and a dimensional proportion between the match point pairs is used as the proportional relation between the target image and the match template.

In particular, for purpose of ensuring accuracy of matching to the utmost extent, an image of a medium resolution level in the pyramid structure is taken as the match template in the present invention, and a local feature description operator of space scaling invariance is used to extract eigenvectors (comprising primary information like position, dimension, and principal direction) from the match template and the target image. According to requirements for feature extraction, in case operation speed of the algorithm is preferred, a feature point extract algorithm proposed in "SURF: speeded up robust features" by H. Bay et al. in "Computer Vision and Image Understanding", 2008 can be adopted in the present invention; while in case accuracy of the algorithm is preferred, a SIFT feature extract algorithm proposed in "Distinctive Image Features from Scale Invariant Key Points" by D. G. Lowe in "International Journal of Computer Vision", 2004 can be adopted.

During locating, firstly, initial match point pairs between the target image and the match template are obtained by the feature point match algorithm. False mach is rejected by homography matrix. Finally, the closest pyramid level (i.e., a carrier image layer of the closest proportion to the target image) is determined according to dimensional proportions between match point pairs, and the corresponding carrier image block numbering in the corresponding level is determined, and then the target image is located in the pyramid structure.

Since the proportional relation between the match template and other carrier image layers in the pyramid structure is predetermined (which is determined by N during construction of the pyramid structure), once the proportional relation between the target image and the match template has been calculated, the carrier image layer with the closest proportion to the target image (which can be defined as the reference image) can be easily determined. As for match point pairs between the target image and the match template, points in the reference image to which feature points from the match template correspond can be determined (this is determined by the intrinsic nature of the pyramid structure), and the second region in the reference image can also be directly obtained.

In the sixth step, the estimated watermark from the fifth step is compared with the watermark image to which the reference image block corresponds, for evaluating similarity therebetween. In the present invention, a normalized correlation coefficient NC is used to evaluate similarity therebetween. However, other methods can also be applied, for example, Bit Error Rate BER, a normalized correlation coefficient NC which has geometrical transform invariance and is proposed in "Watermarking Polygonal Lines Using Fourier Descriptors" by V. Solachidis et al. in "IEEE International Conference on Acoustics, Speech, and Signal Processing", 2000. A large correlation coefficient indicates a high similarity between the extracted watermark and the original watermark.

In another embodiment, the present invention further provides a method for embedding and extracting a multi-scale space based watermark, which comprises the following steps.

In a first step, a pyramid structure of an original image is constructed by: taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \le i \le L$, and N is a constant value; and dividing each carrier image layer into M square carrier image blocks of the same size.

In a second step, a multi-scale structure of a watermark image is constructed, wherein the multi-scale structure comprises L layers, each layer comprises M watermark images of the same size, a watermark image in a layer is formed by reducing a length and width of a watermark image in an underlying layer by a factor of 1/N; and each carrier image block corresponds to a watermark image of a smaller size than the carrier image block.

In a third step, a watermark is embedded by embedding each watermark image into a corresponding carrier image block to obtain the original image containing the watermark.

In a fourth step, a target image from which a watermark will be extracted is located in the pyramid structure of the original image by: taking one of the carrier images as a match template, matching a target image from which a watermark will be extracted with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image from which a watermark will be extracted; on basis of the first region, determining a second region from the carrier image layer which matches the target image, selecting a target image block from the target image, selecting a carrier image block which matches the target image block from the second region, and taking the carrier image block as a reference image block.

In a fifth step, the watermark is extracted by obtaining an estimated watermark by means of the target image block and the reference image block.

In a sixth step, watermarks are compared by evaluating similarity between the estimated watermark and a watermark image to which the reference image block corresponds.

In the method for embedding and extracting a multi-scale space based watermark, during embedding each watermark image into the corresponding carrier image block in the third step, a channel of a corresponding carrier image block which is close to a dominant color is taken as a carrier channel, and the watermark image is embedded into the carrier channel.

In the method for embedding and extracting a multi-scale space based watermark, the fifth step is performed by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; and obtaining the estimated watermark by means of a carrier channel of the target image block and a carrier channel of the modified reference image block.

In the method for embedding and extracting a multi-scale space based watermark, during embedding each watermark image into the corresponding carrier image block in the third step, a transform-domain algorithm is adopted.

In the method for embedding and extracting a multi-scale space based watermark, N has a value of 2.

In another embodiment, the present invention further provides a method for embedding and extracting a multi-scale space based watermark, which comprises the following steps.

In a first step, a pyramid structure of an original image is constructed by: taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \leq i \leq L$, and N is a constant value.

In a second step, a multi-scale structure of a watermark image is constructed, wherein the multi-scale structure comprises L layers, a watermark image in a layer is formed by reducing a length and width of a watermark image in an underlying layer by a factor of 1/N; and each carrier image corresponds to a watermark image of a smaller size than the carrier image.

In a third step, a watermark is embedded by embedding each watermark image into a corresponding carrier image block to obtain the original image containing the watermark.

In a fourth step, a target image from which a watermark will be extracted is located in the pyramid structure of the original image by: taking one of the carrier images as a match template, matching the target image with the match template, on basis of a proportional relation between the target image and the match template and a proportional relation between the match template and the remaining L−1 carrier image layers, determining a carrier image layer with a proportion which is closest to that of the target image, and taking the carrier image layer as a reference image of the target image.

In a fifth step, the watermark is extracted by obtaining an estimated watermark by means of the target image and the reference image.

In a sixth step, watermarks are compared by evaluating similarity between the estimated watermark and a watermark image to which the reference image corresponds.

In the embodiment, watermark images are embedded into all of the carrier image layers, and each carrier image layer has a different resolution. In case the original image suffers from a large scale reducing attack (i.e., an image pirate reduces the original image), it is possible to determine whether the original image has been pirated in the following manner: the target image from which a watermark will be extracted is located in the pyramid structure to a carrier image layer with a corresponding proportion, the carrier image block can be taken as a reference image block, and effective watermark information is extracted from the target image.

In the method for embedding and extracting a multi-scale space based watermark, during embedding each watermark image into the corresponding carrier image block in the third step, a channel of a corresponding carrier image block which is close to a dominant color is taken as a carrier channel, and the watermark image is embedded into the carrier channel.

In the method for embedding and extracting a multi-scale space based watermark, the fifth step is performed by: calculating a pixel value proportion between a channel of the target image into which a watermark image has not been embedded and a corresponding channel in the reference image, multiplying a pixel value of the reference image by the pixel value proportion; on basis of the pixel value proportion, modifying a pixel value domain of the reference image, so that the channel of the target image into which the watermark image has not been embedded has a pixel value consistent with that of a corresponding channel in the modified reference image; and obtaining the estimated watermark by means of a carrier channel of the target image and a carrier channel of the modified reference image.

In the method for embedding and extracting a multi-scale space based watermark, N has a value of 2.

In the method for embedding and extracting a multi-scale space based watermark, in the second step, each watermark image is further subject to a two-dimensional scrambling pretreatment.

Embodiments are presented hereinafter for elucidating advantages of the method of the present invention.

Figure 2:
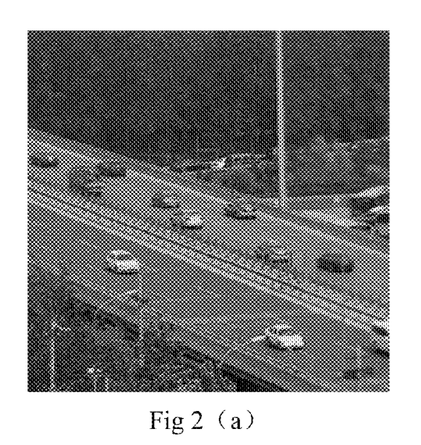
FIG. 2(a) shows an original image.
FIG. 2(b) shows a watermark image.

FIG. 2(a) is an original image of 2048×2048 pixels, and FIG. 2(b) is a watermark image.

First Embodiment

FIG. 1

In a first step, a pyramid structure of an original image is constructed by: taking the original image as the lowest carrier image layer of the pyramid structure, forming from bottom to top the $i^{th}$ carrier image layer over the lowest carrier image layer by reducing a length and width of the original image by a factor of $1/2^i$, wherein the pyramid structure comprises L carrier image layers, $1 \leq i \leq L$; and dividing each carrier image layer into M square carrier image blocks of the same size.

In a second step, a multi-scale structure of a watermark image is constructed, wherein the multi-scale structure comprises L layers, each layer comprises M watermark images of the same size, a watermark image in a layer is formed by reducing a length and width of a watermark image in an underlying layer by a factor of ½; each watermark image is of 256×256 pixels; each watermark image is further subject to a two-dimensional scrambling pretreatment.

In a third step, a watermark is embedded by embedding each watermark image into a corresponding carrier image block to obtain the original image containing the watermark; during embedding each watermark image into the corresponding carrier image block, a channel of a corresponding carrier image block which is close to a dominant color is taken as a carrier channel, and the watermark image is embedded into the carrier channel; during embedding each watermark image into the corresponding carrier image block, a transform-domain algorithm is adopted. The transform-domain algorithm adopts a DCT algorithm.

In a fourth step, a target image from which a watermark will be extracted is located in the pyramid structure of the original image by: taking one of the carrier images as a match template, matching a target image from which a watermark will be extracted with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image from which a watermark will be extracted; on basis of the first region, determining a second region from the carrier image layer which matches the target image, selecting a target image block from the target image, selecting a carrier image block which matches the target image block from the second region, and taking the carrier image block as a reference image block.

An image of a medium resolution level is taken as a match template. The first region on the match template which matches the target image and the proportional relation between the target image and the match template as mentioned above are calculated by: extracting feature points from the target image and the match template respectively, calculating local feature vectors and dimensional feature vectors of feature points from the target image and the match template respectively; calculating match point pairs between the target image and the match template by means of a feature point match algorithm, wherein, a feature point of target image matches a feature point of the match template to constitute a match point pair, the match point pairs are used to express the first region of the match template which matches the target image, and a dimensional proportion between the match point pairs is used as the proportional relation between the target image and the match template.

During locating, firstly, initial match point pairs between the target image and the match template are obtained by the feature point match algorithm. False mach is rejected by homography matrix. Finally, the closest pyramid level (i.e., a carrier image layer of the closest proportion to the target image) is determined according to dimensional proportions between match point pairs, and the corresponding carrier image block numbering in the corresponding level is determined, and then the target image is located in the pyramid structure.

In a fifth step, the watermark is extracted by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; the carrier channel of the target image block and the carrier channel of the reference image block are transformed into a transform domain which is consistent with a transform domain for embedding the watermark, two images in this transform domain are obtained, a difference image between these two images is calculated, and finally the difference image is inversely transformed into a space domain to obtain an estimated watermark.

In a sixth step, watermarks are compared by evaluating similarity between the estimated watermark and a watermark image to which the reference image block corresponds.

Figure 3:
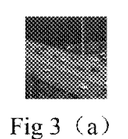
FIG. 3(a) shows a target image, the original image of which is processed by a DCT algorithm and then subject to a reducing attack.
FIG. 3(b) shows a resulting figure, wherein the original image is processed by a DCT algorithm and then is subject to a reducing attack, and a watermark is extracted from the target image.
FIG. 3(c) shows a target image, the original image of which is processed by a DCT algorithm and then subject to a square cropping attack.
FIG. 3(d) shows a resulting figure, wherein the original image is processed by a DCT algorithm and then is subject to a square cropping attack, and a watermark is extracted from the target image.
Figure 5:
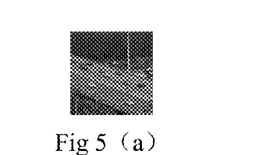
FIG. 5(a) shows a target image, the original image of which is processed by a method in the first embodiment of the present invention and then subject to a reducing attack.
FIG. 5(b) shows a resulting figure, wherein the original image is processed by a method in the first embodiment of the present invention and then is subject to a reducing attack, and a watermark is extracted from the target image.
FIG. 5(c) shows a target image, the original image of which is processed by a method in the first embodiment of the present invention and then subject to a square cropping attack.
FIG. 5(d) shows a resulting figure, wherein the original image of which is processed by a method in the first embodiment of the present invention and then subject to a square cropping attack, and a watermark is extracted from the target image.

In the first embodiment, FIG. 5(a) shows a target image, a watermark is embedded into the original image of which by a method of the present invention and then subject to a reducing attack; FIG. 5(b) shows an extracted watermark; the target image is formed by reducing the original image by factor of 0.1, and NC has a value of 0.9981. FIG. 3(a) shows a target image in which a watermark is embedded directly by a DCT algorithm and is then subject to a reducing attack; FIG. 3(b) shows an extracted watermark; and NC has a value of 0.9935. It is evident from comparison between FIG. 5(b) and FIG. 3(b) that, a central portion of FIG. 3(b) is not clear and watermark information is partially lost, while FIG. 5(b) is very clear and complete watermark information can be extracted.

FIG. 5(c) shows a target image, a watermark is embedded into the original image of which by a method of the present invention and then subject to a square cropping attack; FIG. 5(d) shows an extracted watermark; and NC has a value of 0.8974. FIG. 3(c) shows a target image in which a watermark is embedded directly by a DCT algorithm and is then subject to a reducing attack; FIG. 3(d) shows an extracted watermark; and NC has a value of 0.6551. It is evident from comparison between FIG. 5(d) and FIG. 3(d) that, FIG. 3(d) can not provide watermark information at all, while FIG. 5(d) can substantially extract complete watermark information.

Second Embodiment

In the second step, during embedding the watermark, DWT algorithm is adopted as the transform-domain algorithm. Other conditions follow those in the first embodiment.

Figure 4:
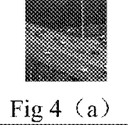
FIG. 4(a) shows a target image, the original image of which is processed by a DWT algorithm and then subject to a reducing attack.
FIG. 4(b) shows a resulting figure, wherein the original image is processed by a DWT algorithm and then is subject to a reducing attack, and a watermark is extracted from the target image.
FIG. 4(c) shows a target image, the original image of which is processed by a DWT algorithm and then subject to a square cropping attack.
FIG. 4(d) shows a resulting figure, wherein the original image of which is processed by a DWT algorithm and then subject to a square cropping attack, and a watermark is extracted from the target image.
Figure 6:
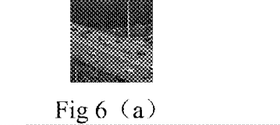
FIG. 6(a) shows a target image, the original image of which is processed by a method in the second embodiment of the present invention and then subject to a reducing attack.
FIG. 6(b) shows a resulting figure, wherein the original image is processed by a method in the second embodiment of the present invention and then is subject to a reducing attack, and a watermark is extracted from the target image.
FIG. 6(c) shows a target image, the original image of which is processed by a method in the second embodiment of the present invention and then subject to a square cropping attack.
FIG. 6(d) shows a resulting figure, wherein the original image of which is processed by a method in the second embodiment of the present invention and then subject to a square cropping attack, and a watermark is extracted from the target image.

In the second embodiment, FIG. 6(a) shows a target image, a watermark is embedded into the original image of which by a method of the present invention and then subject to a reducing attack; FIG. 6(b) shows an extracted watermark; the target image is formed by reducing the original image by factor of 0.1, and NC has a value of 0.9864. FIG. 4(a) shows a target image in which a watermark is embedded directly by a DCT algorithm and is then subject to a reducing attack; FIG. 4(b) shows an extracted watermark; and NC has a value of 0.9564. It is evident from comparison between FIG. 6(b) and FIG. 4(b) that, the extracted watermark information in FIG. 6(b) is more clear and is subject to less interference around the Chinese character "印".

FIG. 6(c) shows a target image, a watermark is embedded into the original image of which by a method of the present invention and then subject to a square cropping attack; FIG. 6(d) shows an extracted watermark; and NC has a value of 0.9245. FIG. 4(c) shows a target image in which a watermark is embedded directly by a DCT algorithm and is then subject to a reducing attack; FIG. 4(d) shows an extracted watermark; and NC has a value of 0.9208. It is evident from comparison between FIG. 6(d) and FIG. 4(d) that, serious interference appears in the left upper portion of the Chinese character "印" in FIG. 4(d), while this interference is significantly reduced and the watermark information is more clear in FIG. 6(d).

On the premise of the same attack, the watermark image can be substantially completely extracted by the method of the present invention.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope.

What is claimed is:

1. A method for embedding and extracting a multi-scale space based watermark, characterized by comprising:
   a first step of constructing a pyramid structure of an original image by taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \leq i \leq L$, and N is a constant value, and dividing each carrier image layer into M square carrier image blocks of the same size;
   a second step of constructing a multi-scale structure of a watermark image by: generating a watermark image of a smaller size than the carrier image block for each carrier image block;
   a third step of embedding a watermark by: embedding each watermark image into a corresponding carrier image block to obtain the original image containing the watermark;
   a fourth step of locating in the pyramid structure of the original image a target image from which a watermark will be extracted by taking one of the carrier images as a match template, matching the target image with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image; on basis of the first region, determining a second region from the carrier image layer which matches the target image, selecting a target image block from the target image, selecting a carrier image block which matches the target image block from the second region, and taking the carrier image block as a reference image block;
   a fifth step of extracting the watermark by: obtaining an estimated watermark by means of the target image block and the reference image block;
   a sixth step of comparing watermarks by: evaluating similarity between the estimated watermark and a watermark image to which the reference image block corresponds.

2. The method of claim 1, characterized in that, during embedding each watermark image into the corresponding carrier image block in the third step, a channel of a corresponding carrier image block which is close to a dominant color is taken as a carrier channel, and the watermark image is embedded into the carrier channel.

3. The method of claim 2, characterized in that, the fifth step is performed by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; and obtaining the estimated watermark by means of a carrier channel of the target image block and a carrier channel of the modified reference image block.

4. The method of claim 3, characterized in that, during embedding each watermark image into the corresponding carrier image block in the third step, a transform-domain algorithm is adopted.

5. The method of claim 1, characterized in that, the first region on the match template which matches the target image and the proportional relation between the target image and the match template in the fourth step are calculated by:
   extracting feature points from the target image and the match template respectively, calculating local feature vectors and dimensional feature vectors of feature points from the target image and the match template respectively;
   calculating match point pairs between the target image and the match template by means of a feature point match algorithm, wherein, a feature point of target image matches a feature point of the match template to constitute a match point pair, the match point pairs are used to express the first region of the match template which matches the target image, and a dimensional proportion between the match point pairs is used as the proportional relation between the target image and the match template.

6. A method for embedding and extracting a multi-scale space based watermark, characterized by comprising the following steps:
   a first step of constructing a pyramid structure of an original image by taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \leq i \leq L$, and N is a constant value; and dividing each carrier image layer into M square carrier image blocks of the same size;
   a second step of constructing a multi-scale structure of a watermark image, wherein the multi-scale structure comprises L layers, each layer comprises M watermark images of the same size, a watermark image in a layer is formed by reducing a length and width of a watermark image in an underlying layer by a factor of $1/N$;

and each carrier image block corresponds to a watermark image of a smaller size than the carrier image block;

a third step of embedding a watermark by: embedding each watermark image into a corresponding carrier image block to obtain the original image containing the watermark;

a fourth step of locating in the pyramid structure of the original image a target image from which a watermark will be extracted by taking one of the carrier images as a match template, matching a target image from which a watermark will be extracted with the match template to determine a first region on the match template which matches the target image, and on basis of a proportional relation between the target image from which a watermark will be extracted and the match template and a proportional relation between the match template and the remaining L−1 carrier image layers, determining a carrier image layer with a proportion which is closest to that of the target image from which a watermark will be extracted; on basis of the first region, determining a second region from the carrier image layer which matches the target image, selecting a target image block from the target image, selecting a carrier image block which matches the target image block from the second region, and taking the carrier image block as a reference image block;

a fifth step of extracting the watermark by: obtaining an estimated watermark by means of the target image block and the reference image block;

a sixth step of comparing watermarks by: evaluating similarity between the estimated watermark and a watermark image to which the reference image block corresponds.

7. The method of claim 6, characterized in that, during embedding each watermark image into the corresponding carrier image block in the third step, a channel of a corresponding carrier image block which is close to a dominant color is taken as a carrier channel, and the watermark image is embedded into the carrier channel.

8. The method of claim 7, characterized in that, the fifth step is performed by: calculating a pixel value proportion between a channel of the target image block into which a watermark image has not been embedded and a corresponding channel in the reference image block, multiplying a pixel value of the reference image block by the pixel value proportion; on basis of the pixel value proportion, modifying a pixel value domain of the reference image block, so that the channel of the target image block into which the watermark image has not been embedded has a pixel value consistent with that of a corresponding channel in the modified reference image block; and obtaining the estimated watermark by means of a carrier channel of the target image block and a carrier channel of the modified reference image block.

9. The method of claim 8, characterized in that, during embedding each watermark image into the corresponding carrier image block in the third step, a transform-domain algorithm is adopted.

10. The method of claim 9, characterized in that, N has a value of 2.

11. A method for embedding and extracting a multi-scale space based watermark, characterized by comprising the following steps:

a first step of constructing a pyramid structure of an original image by taking the original image as the lowest carrier image layer of the pyramid structure, forming from bottom to top the $i^{th}$ carrier image layer over the lowest carrier image layer by reducing a length and width of the original image by a factor of $1/N^i$, wherein the pyramid structure comprises L carrier image layers, $1 \leq i \leq L$, and N is a constant value;

a second step of constructing a multi-scale structure of a watermark image, wherein the multi-scale structure comprises L layers, a watermark image in a layer is formed by reducing a length and width of a watermark image in an underlying layer by a factor of 1/N; and each carrier image corresponds to a watermark image of a smaller size than the carrier image;

a third step of embedding a watermark by: embedding each watermark image into a corresponding carrier image to obtain the original image containing the watermark;

a fourth step of locating in the pyramid structure of the original image a target image from which a watermark will be extracted by taking one of the carrier images as a match template, matching the target image with the match template, on basis of a proportional relation between the target image and the match template and a proportional relation between the match template and the remaining L−1 carrier image layers, determining a carrier image layer with a proportion which is closest to that of the target image, and taking the carrier image layer as a reference image of the target image;

a fifth step of extracting the watermark by: obtaining an estimated watermark by means of the target image and the reference image;

a sixth step of comparing watermarks by: evaluating similarity between the estimated watermark and a watermark image to which the reference image corresponds.

12. The method of claim 11, characterized in that, during embedding each watermark image into the corresponding carrier image block in the third step, a channel of a corresponding carrier image block which is close to a dominant color is taken as a carrier channel, and the watermark image is embedded into the carrier channel.

13. The method of claim 12, characterized in that, the fifth step is performed by: calculating a pixel value proportion between a channel of the target image into which a watermark image has not been embedded and a corresponding channel in the reference image, multiplying a pixel value of the reference image by the pixel value proportion; on basis of the pixel value proportion, modifying a pixel value domain of the reference image, so that the channel of the target image into which the watermark image has not been embedded has a pixel value consistent with that of a corresponding channel in the modified reference image; and obtaining the estimated watermark by means of a carrier channel of the target image and a carrier channel of the modified reference image.

14. The method of claim 11, characterized in that, N has a value of 2.

15. The method of claim 11, characterized in that, in the second step, each watermark image is further subject to a two-dimensional scrambling pretreatment.

* * * * *